US011053648B2

United States Patent
Hou et al.

(10) Patent No.: US 11,053,648 B2
(45) Date of Patent: Jul. 6, 2021

(54) PNEUMATIC FENDER MONITORING SYSTEM

(71) Applicant: The Yokohama Rubber Co., LTD., Tokyo (JP)

(72) Inventors: Gang Hou, Hiratsuka (JP); Masahiko Miyamoto, Hiratsuka (JP); Taro Takahashi, Hiratsuka (JP); Masaharu Manishi, Hiratsuka (JP); Koko Tsuchiya, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/484,446

(22) PCT Filed: Nov. 24, 2017

(86) PCT No.: PCT/JP2017/042168
§ 371 (c)(1),
(2) Date: Aug. 7, 2019

(87) PCT Pub. No.: WO2018/146907
PCT Pub. Date: Aug. 16, 2018

(65) Prior Publication Data
US 2019/0352871 A1 Nov. 21, 2019

(30) Foreign Application Priority Data
Feb. 7, 2017 (JP) .............................. JP2017-020301

(51) Int. Cl.
*B63B 59/02* (2006.01)
*E02B 3/26* (2006.01)
(Continued)

(52) U.S. Cl.
CPC ................ *E02B 3/26* (2013.01); *B63B 43/18* (2013.01); *B63B 59/02* (2013.01); *E02B 17/003* (2013.01); *B63B 2059/025* (2013.01)

(58) Field of Classification Search
CPC ... B63B 43/18; B63B 2043/185; B63B 43/20; B63B 59/02; B63B 2059/025; E02B 3/26; E02B 17/003
(Continued)

(56) References Cited

U.S. PATENT DOCUMENTS 8,041,473 B2 * 10/2011 Yamada .................. B63B 59/00
   701/21
9,334,029 B2 * 5/2016 Miyamoto .............. B63B 21/00
(Continued)

FOREIGN PATENT DOCUMENTS

CN        102906337       1/2013
JP        2003-276677    10/2003
(Continued)

OTHER PUBLICATIONS

International Search Report for International Application No. PCT/JP2017/042168 dated Jan. 9, 2018, 3 pages, Japan.

*Primary Examiner* — Daniel V Venne
(74) *Attorney, Agent, or Firm* — Thorpe North & Western

(57) ABSTRACT

A pneumatic fender monitoring system is provided. Image data captured by using at least one of a front view imaging device that successively images an external shape in a front view of a pneumatic fender used disposed between a vessel and a vessel or a side view imaging device that successively images the external shape in a side view of the pneumatic fender is successively input into a control unit and successively displayed on a monitor, and the control unit determines, on the basis of the image data, whether an amount of deformation of the external shape of the pneumatic fender is within a preset tolerance range or outside of a preset tolerance range.

12 Claims, 9 Drawing Sheets

(51) Int. Cl.
*B63B 43/18* (2006.01)
*E02B 17/00* (2006.01)

(58) Field of Classification Search
USPC .................................................. 114/219, 220
See application file for complete search history.

(56) References Cited

U.S. PATENT DOCUMENTS

| | | | |
|---|---|---|---|
| 9,422,040 B2* | 8/2016 | Ono | B63B 43/18 |
| 9,598,157 B2* | 3/2017 | Arditi | B63B 59/02 |
| 9,659,501 B2* | 5/2017 | Lee | G08G 3/02 |
| 9,725,863 B2* | 8/2017 | Izumi | E02B 3/26 |
| 2010/0070118 A1 | 3/2010 | Yamada et al. | |
| 2013/0076536 A1 | 3/2013 | Nakatani et al. | |
| 2016/0215467 A1 | 7/2016 | Izumi et al. | |

FOREIGN PATENT DOCUMENTS

| | | |
|---|---|---|
| JP | 2010-175298 | 8/2010 |
| JP | 2010-269669 | 12/2010 |
| JP | 2011-123853 | 6/2011 |
| JP | 2013-065352 | 4/2013 |
| JP | 2014-019382 | 2/2014 |
| JP | 2015-092047 | 5/2015 |
| KR | 20-2015-0003058 | 8/2015 |
| WO | WO 2008/053887 | 5/2008 |
| WO | WO 2011/155265 | 12/2011 |
| WO | WO 2015/045950 | 4/2015 |

* cited by examiner

US 11,053,648 B2

PNEUMATIC FENDER MONITORING SYSTEM

TECHNICAL FIELD

The present technology relates to a pneumatic fender monitoring system and particularly relates to a monitoring system that can successively determine the state of the external shape of a pneumatic fender compressed and prevent damage.

BACKGROUND ART

Various monitoring systems that monitor the state of a pneumatic fender are known (for example, see Japan Unexamined Patent Publication Nos. 2010-175298 and 2013-065352). Generally, in a known monitoring system, a meter such as a pressure gauge is disposed inside a fender, and the meter wirelessly sends detection data that is received by a receiver. Such a known monitoring system does not determine the state of the external shape of the pneumatic fender sandwiched between a vessel approaching a quay and the quay; or between two vessels and compressively deformed.

Accordingly, in a known monitoring system, it cannot be determined, for example, whether the pneumatic fender is sandwiched in an irregular state or whether the pneumatic fender is deformed in an abnormal manner and damaged. To prevent damage to a pneumatic fender, it is advantageous to determine the state of the external shape of the pneumatic fender in use on site and take measures accordingly.

SUMMARY

The present technology provides a pneumatic fender monitoring system that can successively determine the state of the external shape of a pneumatic fender compressed and prevent damage.

A pneumatic fender monitoring system according to an embodiment of the present technology includes: at least one of a front view imaging device that successively images an external shape in a front view of a pneumatic fender used disposed between a vessel and an object or a side view imaging device that successively images the external shape in a side view of the pneumatic fender; a control unit that image data captured by at least one of the front view imaging device or the side view imaging device is successively input into; and a monitor that successively displays the image data; the control unit determining, on the basis of the image data, whether an amount of deformation of the external shape of the pneumatic fender is within a preset tolerance range.

According to an embodiment of the present technology, image data captured by using at least one of the front view imaging device that successively images the external shape in a front view of the pneumatic fender in use or the side view imaging device that successively images the external shape in a side view of the pneumatic fender in use is displayed on the monitor. Thus, the state of the external shape of the compressed pneumatic fender can be determined safely successively by using the image data displayed on the monitor. Additionally, the control unit determines, on the basis of the image data, whether the amount of deformation of the external shape of the pneumatic fender is within the preset tolerance range. Thus, appropriate measures can be taken on the basis of this determination to prevent damage to the pneumatic fender.

DETAILED DESCRIPTION

Figure 1:
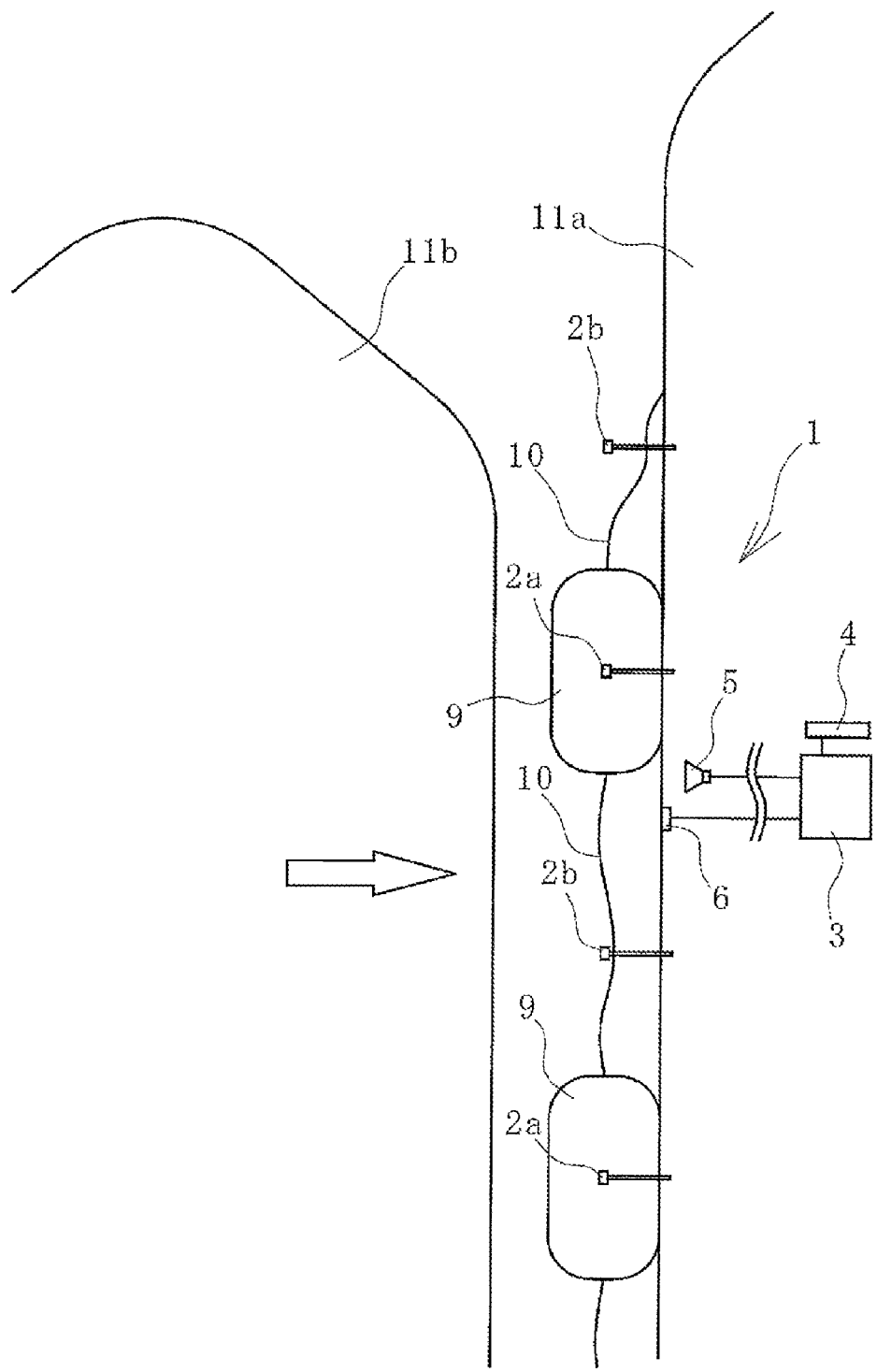
FIG. 1 is an explanatory view illustrating an applicable example of a pneumatic fender monitoring system according to an embodiment of the present technology.

A pneumatic fender monitoring system according to embodiments of the present technology will be described below with reference to the drawings.

A pneumatic fender monitoring system 1 (hereinafter, referred to as a system 1) according to an embodiment of the present technology illustrated in FIGS. 1 to 3 can be applied to a pneumatic fender 9 (hereinafter, referred to as a fender 9) used at sea and the like. The fender 9 includes a cylindrical portion 9 *a* and hemispherical portions 9 *b* formed on both ends of the cylindrical portion 9 *a* and connected to both the ends of the cylindrical portion 9 *a*. The fender 9 may be used in a state of lying sideways, and the ends of the cylindrical portion 9 *a* of the fender 9 may be disposed respectively on a left side and a right side. The fender 9 is used by being disposed between a vessel 11 *a* and an object and used being sandwiched between the vessel 11 *a* and the object. In the embodiment, the fender 9 is disposed between the vessel 11 *a* and another vessel 11 *b* serving as the object.

When the vessel 11*a* relatively large approaches the vessel 11*b* relatively small, a plurality of the fenders 9 installed on the vessel 11*a* are disposed in a row at intervals between the fenders 9. The vessel 11*a* and the fenders 9 are connected via a guy rope 10.

The system 1 includes a front view imaging device 2*a* that successively images the external shape in a front view of the fender 9, a side view imaging device 2*b* that successively images the external shape in a side view of the fender 9, a control unit 3, and a monitor 4. "Front view of the fender 9" refers to a view from a direction substantially orthogonal to the cylinder axial direction of the cylindrical portion 9*a*. "Side view of the fender 9" refers to a view from a direction substantially parallel with the cylinder axial direction of the cylindrical portion 9*a*. A computer or the like is used as the control unit 3.

The system 1 of the embodiment further includes a warning device 5, a distance sensor 6 that successively detects a separation distance X between the vessel 11a and the vessel 11b, a pressure sensor 7 that successively detects an internal pressure P of the fender 9, and a temperature sensor 8 that successively detects an internal temperature T of the fender 9. Examples of the warning device 5 include a warning light, an alarm, and the like. A majority of the constituents of the system 1 are installed on the vessel 11a. The control unit 3 and the monitor 4 are disposed inside a control room or the like. The majority or at least one of the constituents of the system 1 can be installed on another vessel 11b. Note that in the drawings, the constituents of the system 1 are represented larger than the actual size.

Image data captured by the front view imaging device 2a and the side view imaging device 2b are sequentially input into the control unit 3 via wireless or wired communication. Detection data from the distance sensor 6, the pressure sensor 7, and the temperature sensor 8 are also successively input into the control unit 3 via wireless or wired communication. The monitor 4 and the warning device 5 are connected to the control unit 3 in a wireless or wired manner.

As the front view imaging device 2a and the side view imaging device 2b, a digital video camera is used, for example. It is only required that at least one of the front view imaging device 2a or the side view imaging device 2b be installed for each fender 9. The front view imaging device 2a and the side view imaging device 2b can also be installed for each fender 9, or a plurality of the front view imaging devices 2a and a plurality of the side view imaging devices 2b can also be installed for each fender 9. For example, two side view imaging devices 2b can also be installed to image both of the hemispherical portions 9b of the fender 9.

The front view imaging device 2a and the side view imaging device 2b are attached to an arm portion 12 projecting from the vessel 11a. By adjusting and fixing the position of the arm portion 12, the front view imaging device 2a and the side view imaging device 2b are positioned in desired positions. The arm portion 12 preferably has a structure removable from the vessel or a foldable structure. Such a structure enables the arm portion 12 to be detached or folded and stored when the system 1 is not operating.

The image data input into the control unit 3 is successively displayed on the monitor 4. The image data captured by the front view imaging device 2a and the side view imaging device 2b can also be displayed simultaneously on the monitor 4, or the image data captured by the front view imaging device 2a or the side view imaging device 2b can also be displayed selectively. The detection data input into the control unit 3 (separation distance data, internal pressure data, and internal temperature data) can also be displayed successively on the monitor 4.

External shape data (front view and side view data) of the fender 9 expanded to a specified internal pressure and not receiving any special external force (in a neutral state) is input into the control unit 3. In addition, reference data corresponding to a threshold of a tolerance range for the amount of deformation of the external shape of the fender 9 is input.

Figure 4:
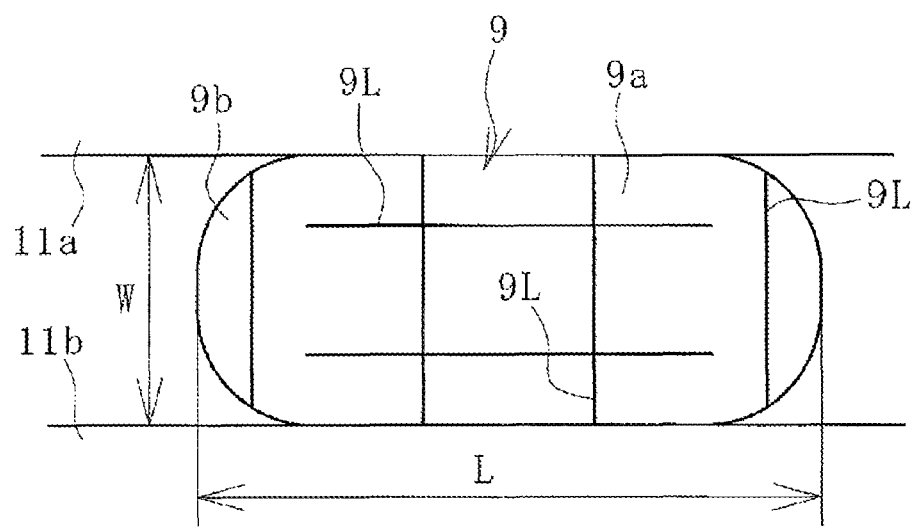
FIG. 4 is an explanatory view illustrating reference data of the fender in a front view of the fender.
Figure 5:
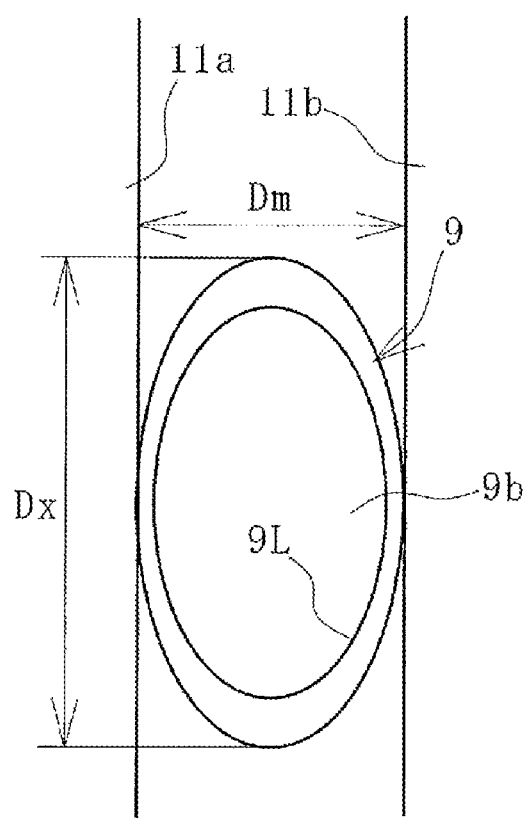
FIG. 5 is an explanatory view illustrating reference data of the fender in a side view of the fender.

As the reference data, as illustrated in FIG. 4, a length L in the cylinder axial direction of the fender 9 in a front view and a length W in the direction orthogonal to the cylinder axial direction of the fender 9 in a front view are used. The length L and the length W are taken in a case where the length of the cylindrical portion 9a is entirely sandwiched between both sides and is pressed with a preset upper limit of external force. Instead of the reference data or in addition to the reference data, as illustrated in FIG. 5, for example, a long diameter Dx or a short diameter Dm of the hemispherical portion 9b in a side view is used. The long diameter Dx or the short diameter Dm is taken in a case where the length of the cylindrical portion 9a is entirely sandwiched between both sides and is pressed with a preset upper limit of external force.

Next, a method for monitoring, via the system 1, the state of the external shape of the fender 9 in use will be described.

Figure 2:
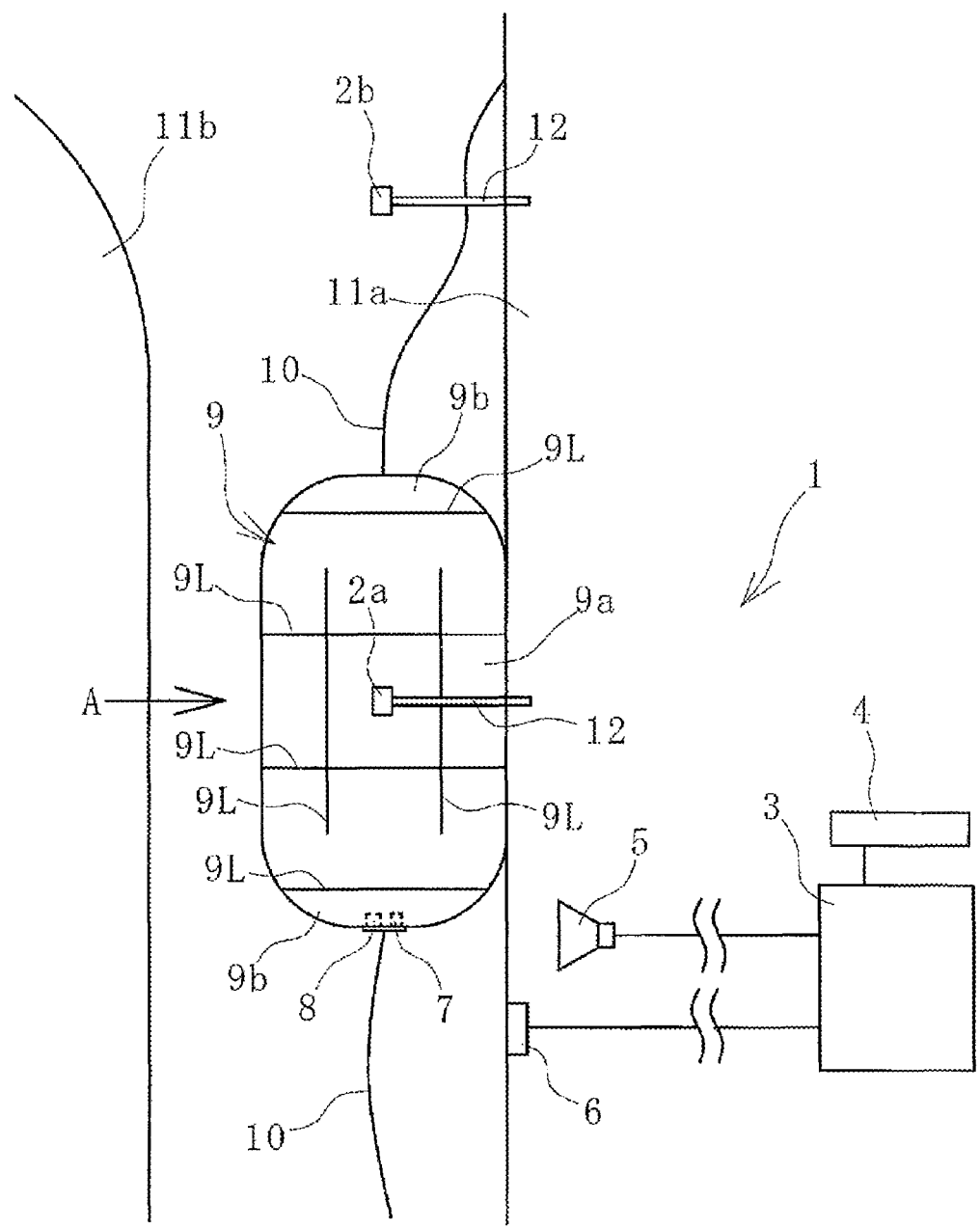
FIG. 2 is an enlarged view of a portion of FIG. 1.
Figure 3:
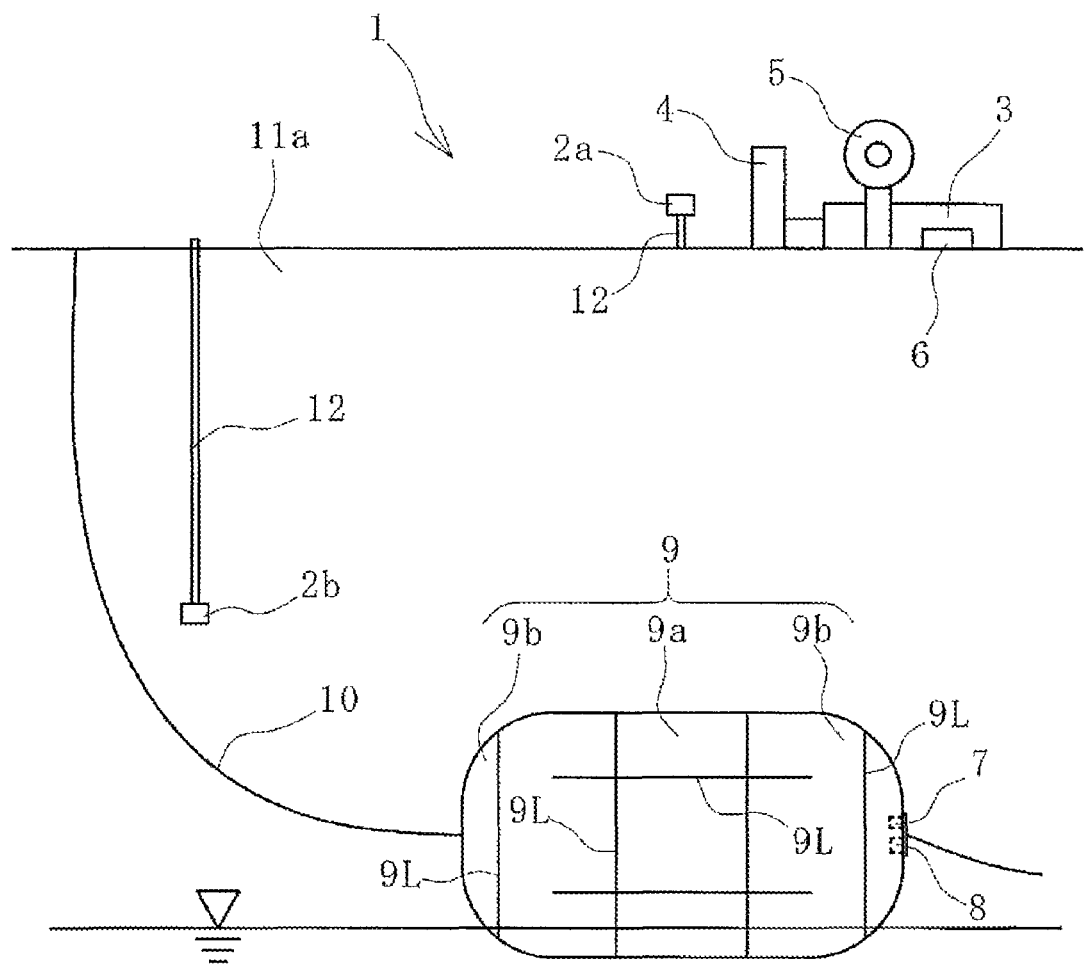
FIG. 3 is a view in the direction of arrow A in FIG. 2.

As illustrated in FIGS. 1 to 3, when another vessel 11b approaches the vessel 11a resting at a predetermined position at sea and when the vessel 11b further approaches the vessel 11a, the fender 9 is sandwiched between the vessel 11a and the vessel 11b and compressively deforms. The vessel 11a and the vessel 11b are maintained in the approach state, and, for example, cargo such as crude oil is transferred from the vessel 11a to another vessel 11b.

In this work process, the external shapes of the fender 9 in a front view and in a side view are successively imaged by the front view imaging device 2a and the side view imaging device 2b respectively. The captured image data is successively input into the control unit 3 and successively displayed in real time on the monitor 4.

The control unit 3 successively specifies a maximum length L1 in the cylinder axial direction of the fender 9 in a front view and a maximum length W1 in the direction orthogonal to the cylinder axial direction of the fender 9 in a front view in the image data; and a long diameter D1 or a short diameter D2 of the hemispherical portion 9b deformed into an elliptical shape in a side view in the image data.

In a case where the fender 9 is compressed, the external shape of the fender 9 changes as described below, for example. The length in the cylinder axial direction increases and the length in the direction orthogonal to the cylinder axial direction decreases. The outer diameter of the hemispherical portion 9b deforms from a circular shape into an elliptical shape in a side view, and thus, an increasing portion (long diameter) and a decreasing portion (short diameter) are present.

Figure 6:
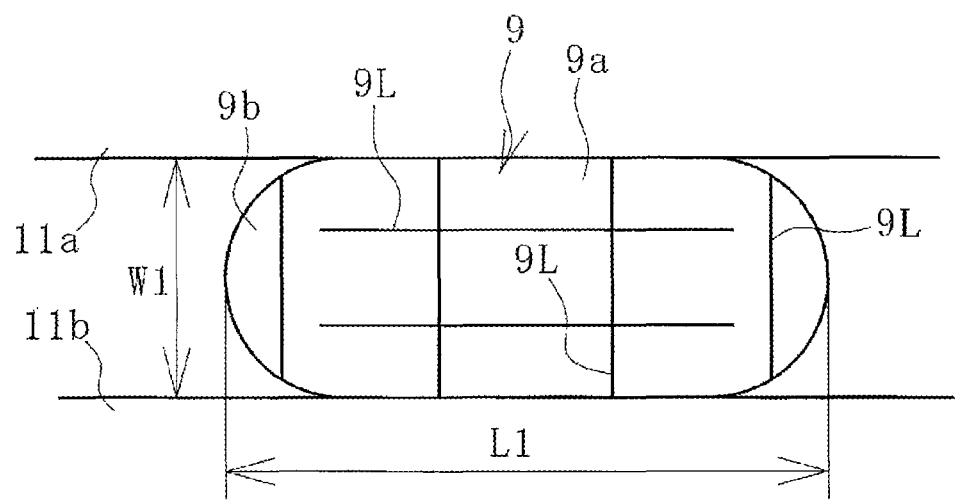
FIG. 6 is an explanatory view illustrating image data of the fender captured by a front view imaging device (in a case where the amount of deformation of the external shape is outside of a tolerance range).
Figure 7:
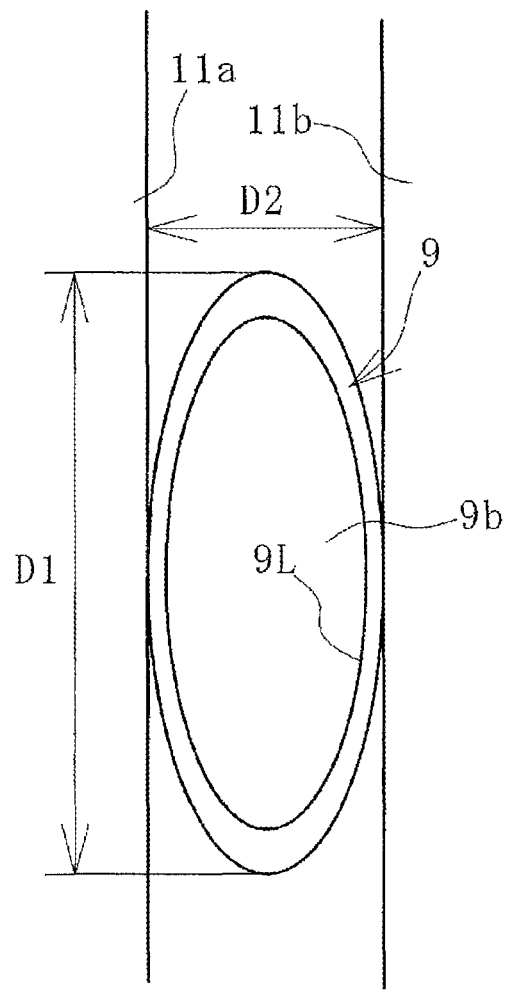
FIG. 7 is an explanatory view illustrating image data of the fender captured by a side view imaging device (in a case where the amount of deformation of the external shape is outside of a tolerance range).

Then, the control unit 3 compares the image data and the reference data and determines whether the amount of change in the external shape of the fender 9 is within or outside of the tolerance range. In the image data illustrated in FIGS. 6 and 7, the length L1 in the cylinder axial direction is greater than the length L of the reference data, the length W1 in the direction orthogonal to the cylinder axial direction is less than the length W of the reference data, the long diameter D1 is greater than the long diameter Dx of the reference data, and the short diameter D2 is less than the short diameter Dm of the reference data. Thus, the amount of deformation of the external shape of the fender 9 is determined to be outside of the tolerance range.

Figure 8:
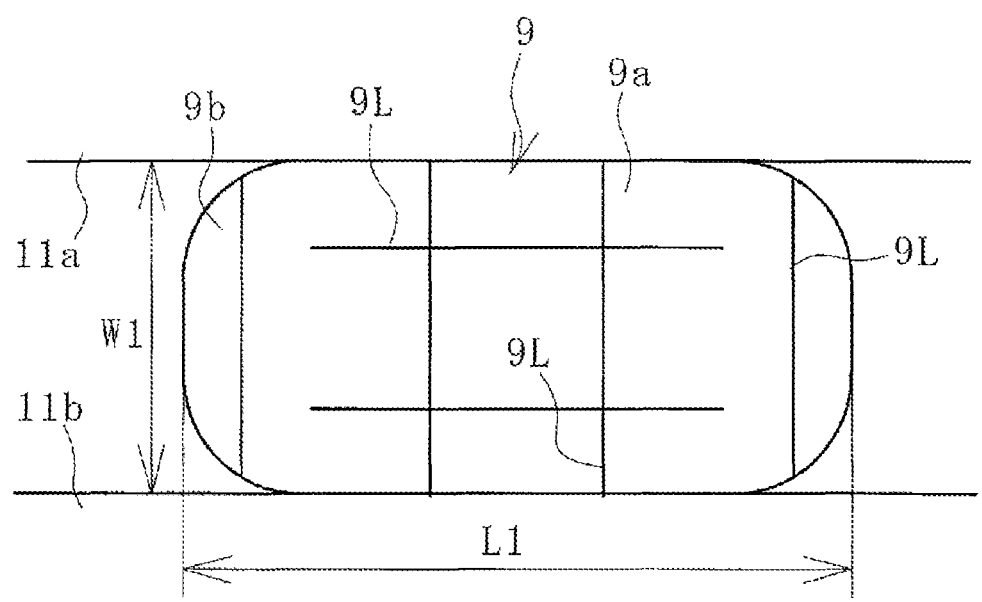
FIG. 8 is an explanatory view illustrating image data of the fender captured by a front view imaging device (in a case where the amount of deformation of the external shape is within a tolerance range).
Figure 9:
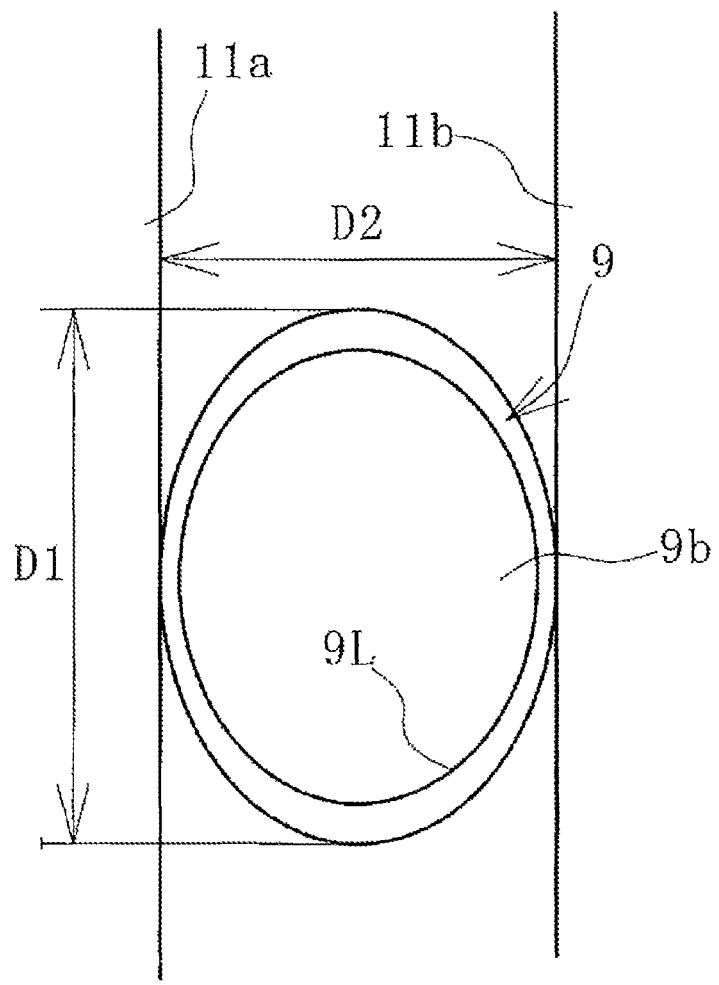
FIG. 9 is an explanatory view illustrating image data of the fender captured by a side view imaging device (in a case where the amount of deformation of the external shape is within a tolerance range).

In a case where the amount of change in the external shape of the fender 9 is not determined to be outside of the tolerance range, the amount of change in the external shape of the fender 9 is determined to be within the tolerance range. In the image data illustrated in FIGS. 8 and 9, the length L1 in the cylinder axial direction is less than the length L of the reference data, the length W1 in the direction orthogonal to the cylinder axial direction is greater than the length W of the reference data, the long diameter D1 is less than the long diameter Dx of the reference data, and the short diameter D2 is greater than the short diameter Dm of the reference data. Thus, the amount of deformation of the external shape of the fender 9 is determined to be within the tolerance range.

In the image data, in a case where the length L1 in the cylinder axial direction is greater than the length L of the reference data, a case where the length W1 in the direction orthogonal to the cylinder axial direction is less than the length W of the reference data, a case where the long diameter D1 is greater than the long diameter Dx of the reference data, and a case where the short diameter D2 is less than the short diameter Dm of the reference data, the amount of deformation of the external shape of the fender 9 is determined to be outside of the tolerance range. However, other settings can be used. For example, when any one of the four cases described above is true, the amount of deformation of the external shape of the fender 9 can be determined to be outside of the tolerance range, or when any two of the cases are true or when any three of the cases are true, the amount of deformation of the external shape of the fender 9 can be determined to be outside of the tolerance range.

In this way, according to the system 1 of an embodiment of the present technology, the state of the external shape of the fender 9 compressed can be determined safely successively by using the image data displayed on the monitor 4. For example, whether the fender 9 is sandwiched in a normal manner and compressively deformed or whether the fender 9 is locally pressed and is deformed in an abnormal manner can be determined by looking at the image data.

Additionally, in a case where the amount of deformation of the external shape of the fender 9 is determined to be outside of the tolerance range, appropriate measures such as increasing the interval between the vessels 11a and 11b can be taken to prevent damage to the fender 9. Providing the front view imaging device 2a and the side view imaging device 2b is also advantageous in that the state of the external shape of the fender 9 compressed can be determined more accurately to prevent damage.

In the embodiment, visually observable identification lines 9L are marked in a surface of the fender 9. The identification lines 9L extend in the cylinder axial direction and the circumferential direction of the cylindrical portion 9a. Using the identification lines 9L as an indicator makes it easier to determine the amount of deformation of the external shape of the fender 9 compressively deformed. To improve visibility, the identification lines 9L may be of a fluorescent color or may contain a reflective material. Some configurations may include at least an identification line 9L extending in the cylinder axial direction or an identification line 9L extending in the circumferential direction. However, including both the identification lines 9L makes it easier to determine the amount of deformation of the external shape of the fender 9.

In the embodiment, an interrelationship between a plurality of parameters can be determined. The plurality of parameters are selected discretionarily from the amount of change of the external shape (state of the external shape) of the fender 9, the separation distance X between the vessel 11a and the vessel 11b, the internal pressure P of the fender 9, and the internal temperature T of the fender 9. Accordingly, by analyzing the interrelationship, damage to the fender 9 can be prevented more reliably.

For example, from the interrelationship between the internal temperature T and the amount of change of the external shape of the fender 9, the temperature dependency of the amount of change of the external shape of the fender 9 can be determined. Then, on the basis of the determined temperature dependency, the reference data described above can be changed depending on the environmental temperature where the fender 9 is used, and for each environmental temperature where the fender 9 is used, whether the amount of change of the external shape of the fender 9 is within the tolerance range can be determined more suitably.

Alternatively, on the basis of the change over time of the separation distance X, the approach speed of the vessels 11a and 11b can be calculated, and from the interrelationship between the approach speed and the amount of change in the external shape of the fender 9, the deformation speed (speed dependency of deformation) of the fender 9 can be determined. Then, from the deformation speed determined, a suitable approach speed of the vessels 11a and 11b can be calculated. By conforming to the suitable approach speed, damage to the fender 9 can be suppressed.

In a case where the amount of deformation of the external shape of the fender 9 is determined to be outside of the tolerance range, the warning device 5 issues a warning following instruction from the control unit 3. Specifically, a warning light of the warning device 5 lights up or flashes. Alternatively, a warning sound such as a siren is issued. The warning alerts workers, supervisors, or the like on site to excessive compressive deformation of the fender 9.

In a configuration, in a case where the amount of deformation is determined to be outside of the tolerance range continuously for a predetermined amount of time, the warning device 5 can also issue a warning to increase the separation distance X between the vessel 11a and the vessel 11b. By slightly moving the vessel 11b away from the vessel 11a depending on the warning, the compressive deformation of the fender 9 can be reduced or eliminated.

In addition to disposing the fender 9 between the vessel 11a and the vessel 11b, the fender 9 may be disposed between the vessel 11a and an object such as a quay. In such a case, the constituents of the system 1 may be installed on the quay or the like.

The invention claimed is:

1. A pneumatic fender monitoring system, comprising:
    at least one of a front view imaging device that successively images an external shape in a front view of a pneumatic fender disposed between a vessel and an object and used being sandwiched between the vessel and the object or a side view imaging device that successively images the external shape in a side view of the pneumatic fender;
    a control unit that image data captured by at least one of the front view imaging device or the side view imaging device is successively input into;
    a monitor that successively displays the image data; and
    hemispherical portions connected to both ends of a cylindrical portion of the pneumatic fender which are disposed respectively on a left side and a right side, wherein the pneumatic fender is used in a state of lying sideways; and
    the control unit determining, on a basis of the image data, whether an amount of deformation of the external shape of the pneumatic fender is within a preset tolerance range.

2. The pneumatic fender monitoring system according to claim 1, comprising a distance sensor that successively detects a separation distance between the vessel and the object, wherein detection data from the distance sensor is successively input into the control unit.

3. The pneumatic fender monitoring system according to claim 1, comprising a warning device that issues a warning following instruction from the control unit in a case where the amount of deformation is determined to be outside of the preset tolerance range.

4. The pneumatic fender monitoring system according to claim 3, wherein the warning device issues a warning to increase a separation distance between the vessel and the object in a case where the amount of deformation is determined to be outside of the preset tolerance range continuously for a predetermined amount of time.

5. The pneumatic fender monitoring system according to claim 1, wherein a visually observable identification line extending in at least a cylinder axial direction or a circumferential direction of the pneumatic fender is provided in a surface of the pneumatic fender.

6. The pneumatic fender monitoring system according to claim 1, comprising a pressure sensor that successively detects an internal pressure of the pneumatic fender, wherein detection data from the pressure sensor is successively input into the control unit.

7. The pneumatic fender monitoring system according to claim 1, comprising a temperature sensor that successively detects an internal temperature of the pneumatic fender, wherein detection data from the temperature sensor is successively input into the control unit.

8. The pneumatic fender monitoring system according to claim 2, comprising a warning device that issues a warning following instruction from the control unit in a case where the amount of deformation is determined to be outside of the preset tolerance range.

9. The pneumatic fender monitoring system according to claim 8, wherein the warning device issues a warning to increase a separation distance between the vessel and the object in a case where the amount of deformation is determined to be outside of the preset tolerance range continuously for a predetermined amount of time.

10. The pneumatic fender monitoring system according to claim 9, wherein a visually observable identification line extending in at least a cylinder axial direction or a circumferential direction of the pneumatic fender is provided in a surface of the pneumatic fender.

11. The pneumatic fender monitoring system according to claim 10, comprising a pressure sensor that successively detects an internal pressure of the pneumatic fender, wherein detection data from the pressure sensor is successively input into the control unit.

12. The pneumatic fender monitoring system according to claim 11, comprising a temperature sensor that successively detects an internal temperature of the pneumatic fender, wherein detection data from the temperature sensor is successively input into the control unit.

* * * * *